United States Patent
Cheng et al.

(10) Patent No.: US 10,101,644 B2
(45) Date of Patent: Oct. 16, 2018

(54) ILLUMINATION SYSTEM AND PROJECTION APPARATUS

(71) Applicant: Coretronic Corporation, Hsin-Chu (TW)

(72) Inventors: Chuan-Te Cheng, Hsin-Chu (TW); Meng-Hsuan Lin, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 318 days.

(21) Appl. No.: 15/176,027

(22) Filed: Jun. 7, 2016

(65) Prior Publication Data

US 2017/0075203 A1 Mar. 16, 2017

(30) Foreign Application Priority Data

Sep. 14, 2015 (CN) .......................... 2015 1 0580283

(51) Int. Cl.
*G03B 21/20* (2006.01)
*G02B 27/14* (2006.01)
(Continued)

(52) U.S. Cl.
CPC ......... *G03B 21/204* (2013.01); *G02B 26/008* (2013.01); *G02B 27/141* (2013.01);
(Continued)

(58) Field of Classification Search
CPC .................................................. G03B 21/204
See application file for complete search history.

(56) References Cited

U.S. PATENT DOCUMENTS

2005/0270775 A1 12/2005 Harbers et al.
2009/0034284 A1* 2/2009 Li .......................... H04N 9/315
362/554

(Continued)

FOREIGN PATENT DOCUMENTS

CN 102455512 B 3/2014
CN 103062672 B 3/2015
(Continued)

OTHER PUBLICATIONS

EPO Search Report of a counterpart foreign application, dated Mar. 27, 2017.

*Primary Examiner* — Toan Ton
*Assistant Examiner* — Danell L Owens
(74) *Attorney, Agent, or Firm* — Li-Jen Shen

(57) ABSTRACT

An illumination system includes a light source assembly including a first excitation light source, a second excitation light source, a dichroic element, a wavelength conversion element, a first collimating element and a second collimating element. The first and second excitation light sources provide first and second excitation beams, respectively. The dichroic element is disposed between the first excitation light source and the second excitation light source. The second excitation beam is transmitted toward the first excitation light source through the dichroic element. The wavelength conversion element is disposed between the first excitation light source and the dichroic element. The wavelength conversion element converts the first and second excitation beams into a wavelength conversion beam and transmits it toward the dichroic element.

20 Claims, 11 Drawing Sheets

(51) Int. Cl.
*G02B 27/30* (2006.01)
*G02B 26/00* (2006.01)
*H04N 9/31* (2006.01)

(52) U.S. Cl.
CPC .......... *G02B 27/30* (2013.01); *G03B 21/208* (2013.01); *G03B 21/2013* (2013.01); *H04N 9/3114* (2013.01); *H04N 9/3158* (2013.01); *H04N 9/3164* (2013.01); *G02B 27/149* (2013.01)

(56) References Cited

U.S. PATENT DOCUMENTS

| | | |
|---|---|---|
| 2012/0099082 A1 | 4/2012 | Wang |
| 2013/0088471 A1* | 4/2013 | Kitano ................ H04N 9/3114 345/208 |
| 2013/0094182 A1 | 4/2013 | Morgenbrod et al. |
| 2013/0163224 A1 | 6/2013 | Chang |
| 2013/0271947 A1 | 10/2013 | Finsterbusch |
| 2014/0347842 A1 | 11/2014 | Copner et al. |
| 2014/0355240 A1 | 12/2014 | Farchtchian |
| 2015/0146409 A1 | 5/2015 | Furuta |

FOREIGN PATENT DOCUMENTS

| | | |
|---|---|---|
| DE | 102008011866 A1 | 9/2009 |
| DE | 102010062465 A1 | 6/2012 |
| EP | 1605199 A2 | 12/2005 |
| JP | 2006-215558 A | 8/2006 |
| JP | 2015-111261 A | 6/2015 |
| WO | 2009017992 A1 | 2/2009 |

* cited by examiner

ILLUMINATION SYSTEM AND PROJECTION APPARATUS

FIELD OF THE INVENTION

The invention relates to an illumination system, and more particularly to an illumination system and a projection apparatus equipped with the illumination system having a wavelength conversion element.

BACKGROUND OF THE INVENTION

Basically, the projector with the solid-state light source has the following three types of light source systems: lasers, light emitting diodes (LEDs), and a combination of laser and light emitting diodes. Laser light source system usually uses blue laser with fluorescence wheel or phosphor wheel, and the fluorescent wheel contains phosphor layer for exciting red beam or phosphor layer for exciting green beam. LED light source system usually comprises a light emitting diode module for emitting red light, a light emitting diode module for emitting green light and a light emitting diode module for emitting blue light. The light source system with a combination of laser and light emitting diodes usually uses blue laser with fluorescence wheel, wherein the fluorescent wheel contains phosphor for exciting red beam or phosphor for exciting green beam, and the beam with the rest colors are emitted by light emitting diode or laser with specified wavelengths.

Generally, the existing technology uses dichroic mirror to combine the red, green and blue beams provided by the respective light source modules. However, due to the physical limitation of the dichroic mirror, only one of the red, green or blue light source modules is selected to use. Therefore, when the brightness of image display needs to enhance, either the power of each light source module or the quantity of laser or light emitting diodes in each light source module is required to increase. However, the aforementioned approaches may lead to the following problems: (1) the photoelectric conversion efficiency decreases if simply increasing the power of the light source module, further, the increase in power may disproportionate to the increase in the brightness and the brightness may be saturated; and therefore, the brightness may not be enhanced by indefinitely increasing the power; (2) the component size of the light source system may increase and the entire volume of the light source system may become large if simply increasing the quantity of laser or light emitting diodes; (3) the etendue may increase if simply increasing the quantity of laser or light emitting diodes, and the brightness may not be able to enhance any longer by increasing the quantity of laser or light emitting diodes if the etendue has a mismatch with the designing configuration of the projector or the etendue reaches to the maximum.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide an illumination system able to enhance the optical power of the beam provided by the illumination system.

Another object of the invention is to provide an illumination system including three light source assemblies with various colors, and the illumination system has enhanced optical power of the beam provided by the illumination system.

Still another object of the invention is to provide an illumination system having enhanced optical power of the wavelength conversion beam without increasing the light etendue; and consequentially, a projection apparatus using the illumination system has enhanced brightness of the images projected onto a screen.

Other objects and advantages of the invention may be further illustrated by the technical features broadly embodied and described as follows.

In order to achieve one or a portion of or all of the objects or other objects, the invention provides an illumination system including a light source assembly. The light source assembly includes a first excitation light source, a second excitation light source, a dichroic element, a wavelength conversion element, a first collimating element and a second collimating element. The first excitation light source is configured to provide a first excitation beam. The second excitation light source is configured to provide a second excitation beam. The first excitation beam and the second excitation beam have the same color. The dichroic element is disposed between the first excitation light source and the second excitation light source. The second excitation beam is transmitted toward the first excitation light source through the dichroic element. The wavelength conversion element is disposed between the first excitation light source and the dichroic element. The wavelength conversion element is configured to convert the first excitation beam and the second excitation beam into a wavelength conversion beam and transmit the wavelength conversion beam toward the dichroic element. The first collimating element is disposed between the wavelength conversion element and the dichroic element. The second collimating element is disposed between the second excitation light source and the dichroic element.

The invention further provides an illumination system including a first light source assembly configured to provide a first color beam, a second light source assembly configured to provide a second color beam and a third light source assembly configured to provide a third color beam. The first color beam, the second color beam and the third color beam may be integrated as an illumination beam. The first light source assembly includes a first excitation light source, a second excitation light source, a first dichroic element and a first wavelength conversion element. The first excitation light source is configured to provide a first excitation beam. The second excitation light source is configured to provide a second excitation beam. The first excitation beam and the second excitation beam have the same color. The first dichroic element is disposed between the first excitation light source and the second excitation light source. The second excitation beam is transmitted toward the first excitation light source through the first dichroic element. The first wavelength conversion element is disposed between the first excitation light source and the first dichroic element. The first wavelength conversion element is configured to convert the first excitation beam and the second excitation beam into a first wavelength conversion beam and transmit the first wavelength conversion beam toward the first dichroic element. The first wavelength conversion beam is the first color beam.

The invention further provides a projection apparatus including a light source assembly, a light equalizing element, a light valve and a projection lens. The light source assembly includes a first excitation light source, a second excitation light source, a dichroic element, a wavelength conversion element, a first collimating element and a second collimating element. The first excitation light source is configured to provide a first excitation beam. The second excitation light source is configured to provide a second excitation beam. The first excitation beam and the second excitation beam have the same color. The dichroic element is disposed between the first excitation light source and the second excitation light source. The second excitation beam is transmitted toward the first excitation light source through the dichroic element. The wavelength conversion element is disposed between the first excitation light source and the dichroic element. The wavelength conversion element is configured to convert the first excitation beam and the second excitation beam into a wavelength conversion beam and transmit the wavelength conversion beam toward the dichroic element. The first collimating element is disposed between the wavelength conversion element and the dichroic element. The second collimating element is disposed between the second excitation light source and the dichroic element. The light equalizing element is disposed on the transmission path of the wavelength conversion beam and configured to receive the wavelength conversion beam transmitted from the dichroic element. The light valve is disposed on the transmission path of the wavelength conversion beam and configured to convert the wavelength conversion beam, transmitted from the light equalizing element, into an image beam. The projection lens is disposed on the transmission path of the image beam and is configured to project the image beam.

In summary, in the illumination system of the invention, the light source assembly has two excitation light sources for providing excitation beams and the two excitation beams excite the wavelength conversion element to emit the wavelength conversion through the two sides of the wavelength conversion element, respectively. Therefore, the optical power of the wavelength conversion beam may be enhanced without increasing the light etendue, and consequentially the illumination system has enhanced optical power of the beam provided by the illumination system.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
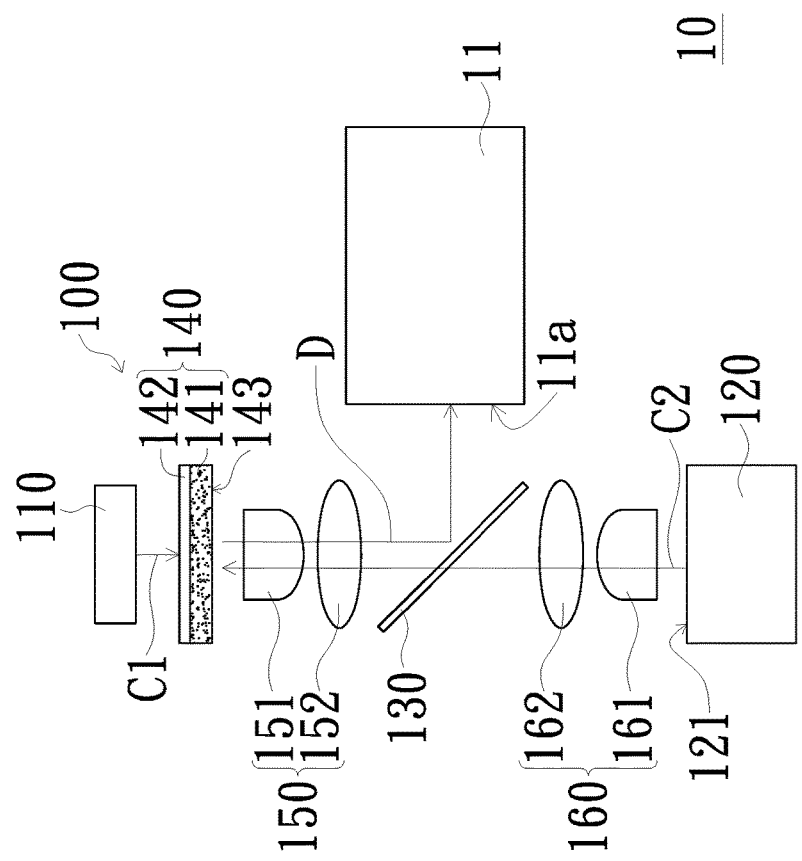
FIG. 1 is a schematic view of an illumination system in accordance with an embodiment of the invention.

FIG. 1 is a schematic view of an illumination system in accordance with an embodiment of the invention. As shown in FIG. 1, the illumination system 10 of the embodiment includes a light source assembly 100. The light source assembly 100 includes a first excitation light source 110, a second excitation light source 120, a dichroic element 130, a wavelength conversion element 140, a first collimating element 150 and a second collimating element 160. The first excitation light source 110 is configured to provide a first excitation beam C1; the second excitation light source 120 is configured to provide a second excitation beam C2; and the first excitation beam C1 and the second excitation beam C2 have the same color, such as blue, for example. The wavelengths of the first excitation beam C1 and the second excitation beam C2 may be located within a certain range, for example, located within in a range 450~475 nm if the two beams are blue. The dichroic element 130 is disposed between the first excitation light source 110 and the second excitation light source 120. In one embodiment, the dichroic element 130 is a dichroic mirror, through which the second excitation beam C2 is transmitted toward the first excitation light source 110. The wavelength conversion element 140 is disposed between the first excitation light source 110 and the dichroic element 130. The wavelength conversion element 140 is configured to convert the first excitation beam C1 and the second excitation beam C2 into a wavelength conversion beam D and transmit the wavelength conversion beam D toward the dichroic element 130. The first collimating element 150 is disposed between the wavelength conversion element 140 and the dichroic element 130. The second collimating element 160 is disposed between the second excitation light source 120 and the dichroic element 130.

In the embodiment, the wavelength conversion element 140 and the first excitation light source 110 are two separated elements and have a preset distance apart from each other; wherein the preset distance is not greater than the distance between the wavelength conversion element 140 and the dichroic element 130. The first excitation light source 110 may be a light emitting diode, a laser light source or other suitable light source. Similarly, the second excitation light source 120 may be a light emitting diode, a laser light source or other suitable source. The wavelength conversion element 140 has a wavelength conversion material layer 141 and a dichroic layer 142. The dichroic layer 142 is disposed on the wavelength conversion material layer 141 and adjacent to the first excitation light source 110. In other words, the dichroic layer 142 is disposed between the wavelength conversion material layer 141 and the first excitation light source 110. The wavelength conversion material layer 141 includes wavelength conversion material such as fluorescent powder or phosphor powder, but the invention is not limited thereto. The surfaces of the wavelength conversion material layer 141 are configured to absorb the first excitation beam C1 and the second excitation beam C2, and the wavelength conversion material layer 141 emits the wavelength conversion beam D to the dichroic element 130. The first excitation beam C1 may pass through the dichroic layer 142 and then is transmitted to the wavelength conversion material layer 141. The wavelength conversion beam D emitted from the wavelength conversion material may be transmitted toward various directions; that is, a portion of the wavelength conversion beam D is transmitted toward the dichroic element 130 and a portion of the wavelength conversion beam D is transmitted toward the dichroic layer 142. Therefore, by using the dichroic layer 142 to reflect the wavelength conversion beam D transmitting toward the dichroic layer 142 so as to direct the wavelength conversion beam D to transmit toward the dichroic element 130, the total optical output of the wavelength conversion beam D transmitting to the dichroic element 130 is increased.

In the embodiment, the first excitation light source 110 and the second excitation light source 120 are disposed on the two sides of the dichroic element 130, respectively. The second excitation beam C2 may pass through the dichroic element 130 and the wavelength conversion beam D may be reflected by the dichroic element 130. After passing through the dichroic element 130, the second excitation beam C2 is transmitted to one side of the wavelength conversion material layer 141 facing the dichroic element 130. After passing through the dichroic layer 142, the first excitation beam C1 is transmitted to one side of the wavelength conversion material layer 141 facing the dichroic layer 142. In the embodiment, by using the first excitation beam C1 and the second excitation beam C2 to excite the wavelength conversion material through the two sides of the wavelength conversion element 140, the output of the wavelength conversion beam D is enhanced without increasing the light etendue.

The first collimating element 150 and the second collimating element 160 may have the same configuration. In the embodiment, for example, the first collimating element 150 includes a collimating lens 151 and a lens 152. The lens 152 is disposed between the collimating lens 151 and the dichroic element 130. The second collimating element 160 includes a collimating lens 161 and a lens 162. The lens 162 is disposed between the collimating lens 161 and the dichroic element 130. In the embodiment, the collimating lenses 151, 161 have the same shape and the lenses 152, 162 have the same shape. However, the specified configurations of the first collimating element 150 and the second collimating element 160 as well as the quantities of the collimating lens and lens therein are not limited in the invention. Namely, a designer may provide collimating lens and lens with different structures and quantities in response to actual requirements. Further, the optical distance of the second excitation beam C2 from the second excitation light source 120 to the dichroic element 130 is equal to the optical distance of the wavelength conversion beam D from the wavelength conversion element 140 to the dichroic element 130. By using the first collimating element 150 and the second collimating element 160 to control the irradiation range of the second excitation beam C2, the facula of the second excitation beam C2 on the wavelength conversion element 140 is similar to that of the second excitation beam C2 on the light-exiting surface 121 of the second excitation light source 120. In one embodiment, the shape and area size of the light-exiting surface 121 of the second excitation light source 120 are same as those of the light-exiting surface 143 of the wavelength conversion element 140, respectively. Therefore, the second excitation beam C2 may substantially cover the entire wavelength conversion element 140, thereby improving light utilization and avoiding light losses.

The color configuration of the first excitation beam C1, the second excitation beam C2 and the wavelength conversion beam D may be determined according to actual requirements. For example, the color configuration may be selected from one of: (1) both of the first excitation beam C1 and the second excitation beam C2 are blue light, and the wavelength conversion beam D is green light; (2) both of the first excitation beam C1 and the second excitation beam C2 are blue light, and the wavelength conversion beam D is red light; (3) both of the first excitation beam C1 and the second excitation beam C2 are blue light, and the wavelength conversion beam D is yellow light; and (4) both of the first excitation beam C1 and the second excitation beam C2 are ultraviolet light, and the wavelength conversion beam D is white light.

As shown in FIG. 1, the illumination system 10 of the embodiment may further include other optical element(s), which is disposed on the transmission path of the wavelength conversion beam D after passing through the dichroic element 130. The optical element may include a light equalizing element (e.g., light integral rod or lens array), a lens or a mirror, and the quantity of the aforementioned optical element may be one or more than one. FIG. 1 is exemplified by having a light integral rod 11, to which the wavelength conversion beam D is transmitted via the dichroic element 130. In one embodiment, the ratio of the area size of the light-entering end 11a of the light integral rod 11 to the area size of the light-exiting surface 143 of the wavelength conversion element 140 is ranged from 0.9 to 1.1. The shape of the light-entering end 11a is similar to that of the light-exiting surface 143; therefore, the wavelength conversion beam D may be received completely.

In the embodiment, the wavelength conversion element 140 and the first excitation light source 110 are two separated elements. In another embodiment, the wavelength conversion element may be attached to the first excitation light source or the wavelength conversion element may be disposed in the first excitation light source.

Figure 2:
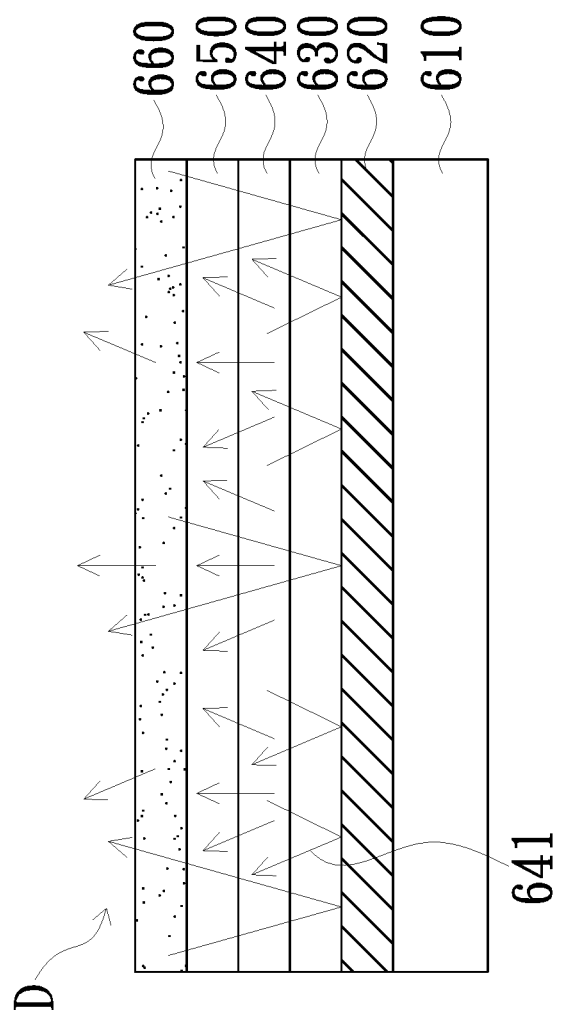
FIG. 2 is a schematic cross-sectional view of an element integrated by the wavelength conversion element and the first excitation light source in accordance with an embodiment of the invention.

FIG. 2 is a schematic cross-sectional view of an element integrated by the wavelength conversion element and the first excitation light source in accordance with an embodiment of the invention. As shown in FIG. 2, the wavelength conversion element includes a conductive carrier 610, a reflective layer 620, a hole-transmission layer 630, a light-emitting layer 640, an electron transmission layer 650 and a wavelength conversion layer 660. The layers are sequentially stacked; wherein the positions of the hole-transmission layer 630 and the electron transmission layer 650 are interchangeable. The holes and electrons respectively provided by the hole-transmission layer 630 and the electron transmission layer 650 are combined in the light-emitting layer 640 to generate photons, and accordingly light 641 is formed and emitted out from the light-emitting layer 640. A portion of the light 641 from the light emitting layer 640 transmitting toward the reflective layer 620 is reflected to the wavelength conversion layer 660, and the portion of light 641 emitting toward the wavelength conversion layer 660 is defined as the first excitation beam C1. The wavelength conversion layer 660 then converts the first excitation beam C1 into the wavelength conversion beam D and a portion of the wavelength conversion beam D transmitting toward the reflective layer 620 is reflected and then emitted out the element through the wavelength conversion layer 660.

Figure 3:
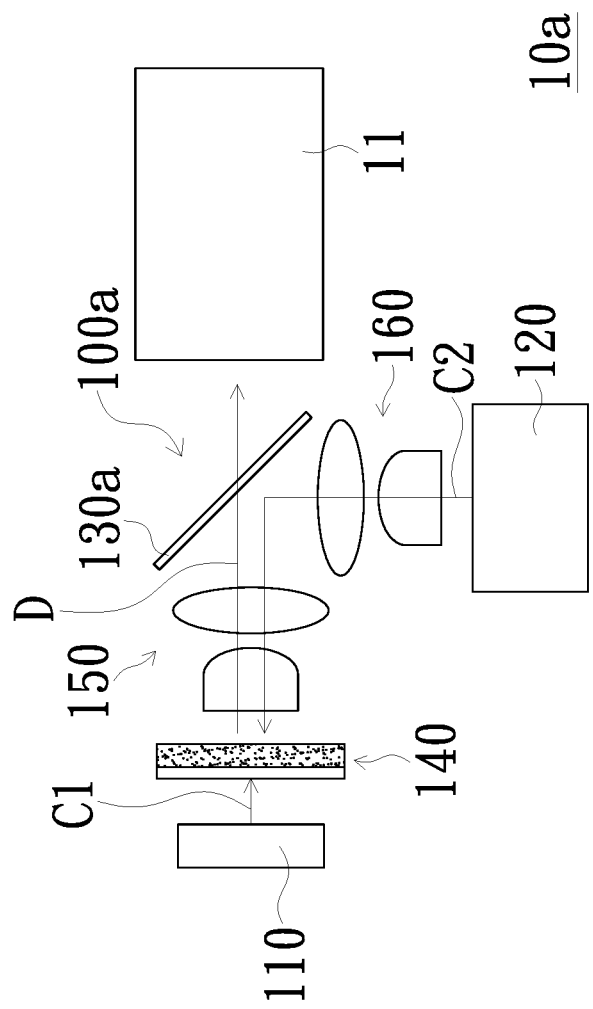
FIG. 3 is a schematic view of an illumination system in accordance with another embodiment of the invention.

FIG. 3 is a schematic view of an illumination system in accordance with another embodiment of the invention. As shown in FIG. 3, the illumination system 10a of the embodiment is similar to the illumination system 10 of FIG. 1, and only the difference between the two is described in the following. In the illumination system 10a of the embodiment, the first excitation light source 110 and the second excitation light source 120 of the light source assembly 100a are disposed on the same side of the dichroic element 130a. The second excitation beam C2 may be reflected by the dichroic element 130a and the wavelength conversion beam D may pass through the dichroic element 130a.

Figure 4:
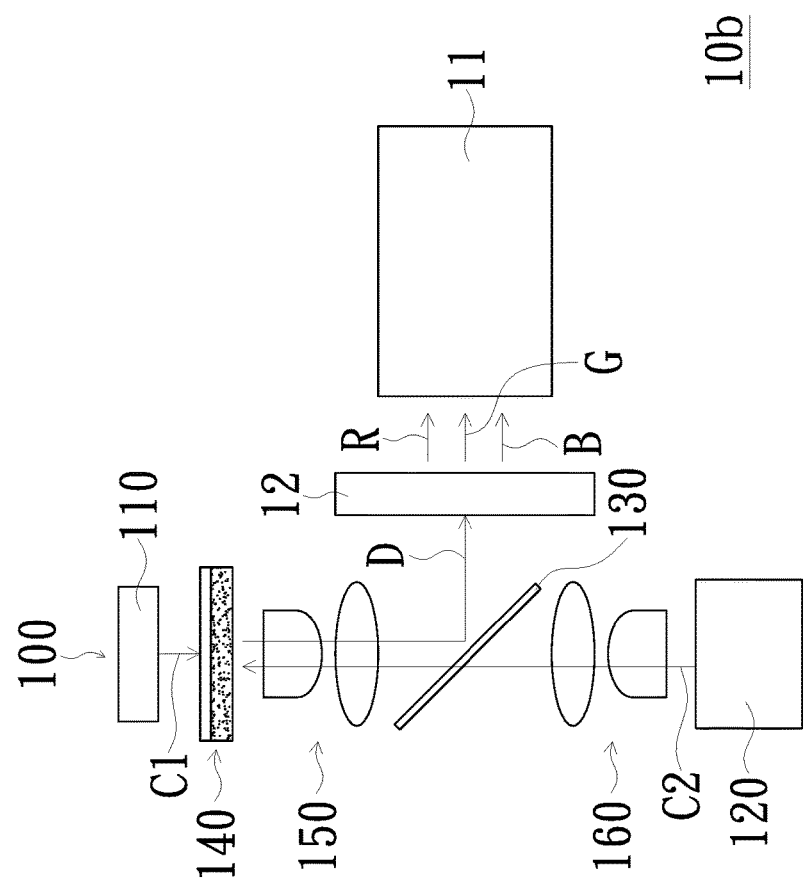
FIG. 4 is a schematic view of an illumination system in accordance with another embodiment of the invention.

FIG. 4 is a schematic view of an illumination system in accordance with another embodiment of the invention. As shown in FIG. 4, the illumination system 10b of the embodiment is similar to the illumination system 10 of FIG. 1, and only the difference between the two is described in the following. Compared with the illumination system 10 of FIG. 1, the illumination system 10b of the embodiment further includes a color wheel 12. The color wheel 12 is disposed on the transmission path of the wavelength conversion beam D reflected by the dichroic element 130. In the embodiment, the first excitation beam C1 and the second excitation beam C2 respectively provided by the first excitation light source 110 and the second excitation light source 120 are ultraviolet light, and the wavelength conversion beam D emitted from the wavelength conversion element 140 is white light. Per revolution of the color wheel 12, the wavelength conversion beam D may be sequentially filtered into beams with various colors, such as red beam R, green beam G and blue beam B, which are transmitted to the light integral rod 11 in timing. It is to be noted that the colors of the beams filtered by the color wheel 12 and the generating sequence of the beams with various colors are not limited in the invention.

Figure 5:
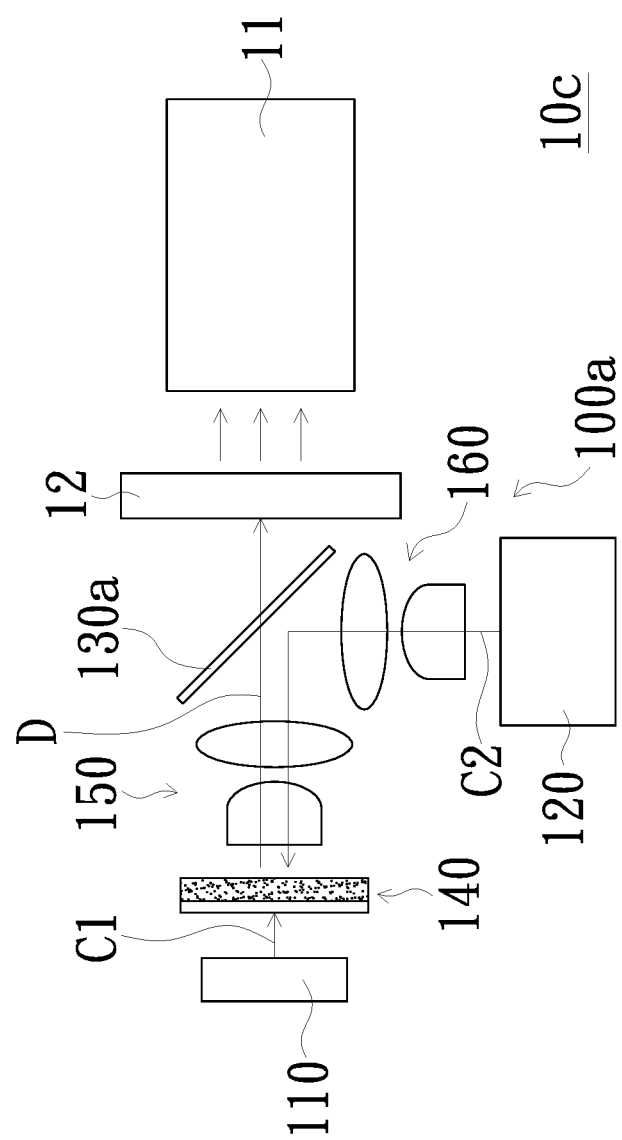
FIG. 5 is a schematic view of an illumination system in accordance with another embodiment of the invention.

FIG. 5 is a schematic view of an illumination system in accordance with another embodiment of the invention. As shown in FIG. 5, the illumination system 10c of the embodiment is similar to the illumination system 10b of FIG. 4, and only the difference between the two is described in the following. In the illumination system 10c of the embodiment, the first excitation light source 110 and the second excitation light source 120 of the light source assembly 100a are disposed on the same side of the dichroic element 130a. The second excitation beam C2 may be reflected by the dichroic element 130a; and the wavelength conversion beam D may pass through the dichroic element 130a and then is transmitted to the color wheel 12.

Figure 6:
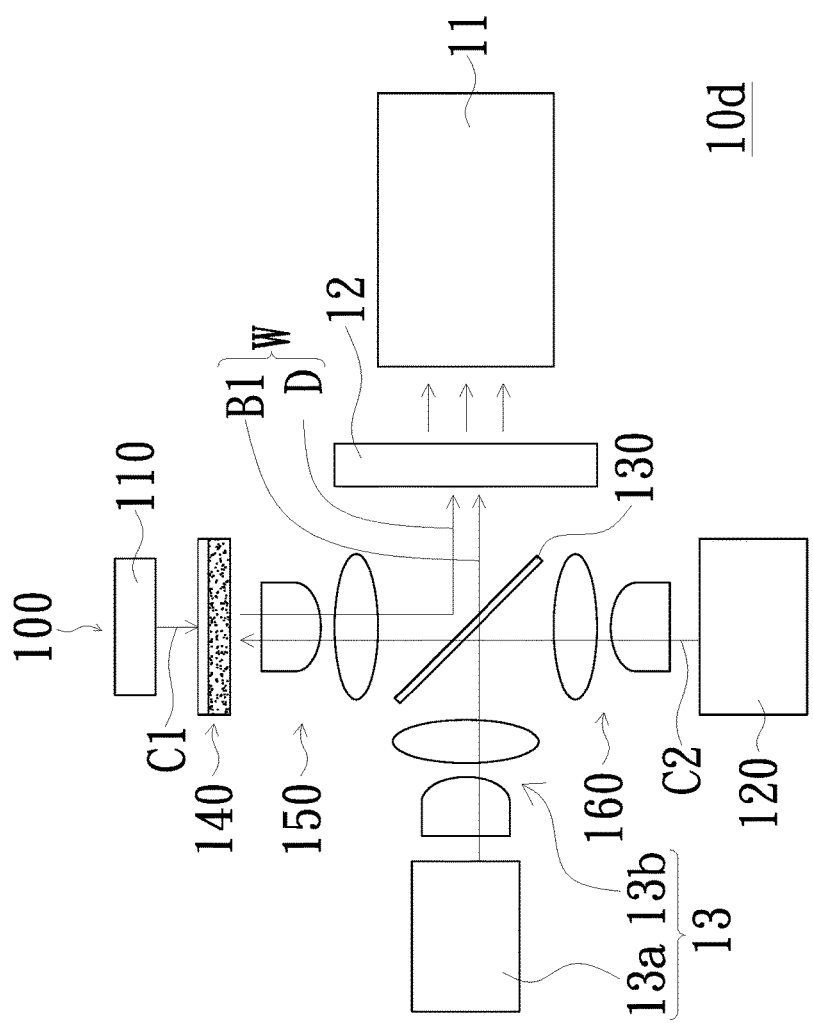
FIG. 6 is a schematic view of an illumination system in accordance with another embodiment of the invention.

FIG. 6 is a schematic view of an illumination system in accordance with another embodiment of the invention. As shown in FIG. 6, the illumination system 10d of the embodiment is similar to the illumination system 10b of FIG. 4, and only the difference between the two is described in the following. In the illumination system 10d of the embodiment, the first excitation beam C1 and the second excitation beam C2 respectively provided by the first excitation light source 110 and the second excitation light source 120 are blue light, and the wavelength conversion beam D emitted from the wavelength conversion element 140 is yellow light. In addition, the illumination system 10d further includes a blue light source assembly 13. The blue light source assembly 13 and the second excitation light source 120 are disposed on the same side of the dichroic element 130. The blue light source assembly 13 is configured to provide a blue beam B1. The blue beam B1 passes through the dichroic element 130 and is combined with wavelength conversion beam D to form a white beam W. The white beam W is then transmitted to the color wheel 12. The blue light source assembly 13 includes a blue light source 13a and a collimating element 13b. The blue light source 13a may be a blue light emitting diode, a laser light source, or other suitable light source. The collimating element 13b may have a structure same as those of the first collimating element 150 and the second collimating element 160, for example.

Figure 7:
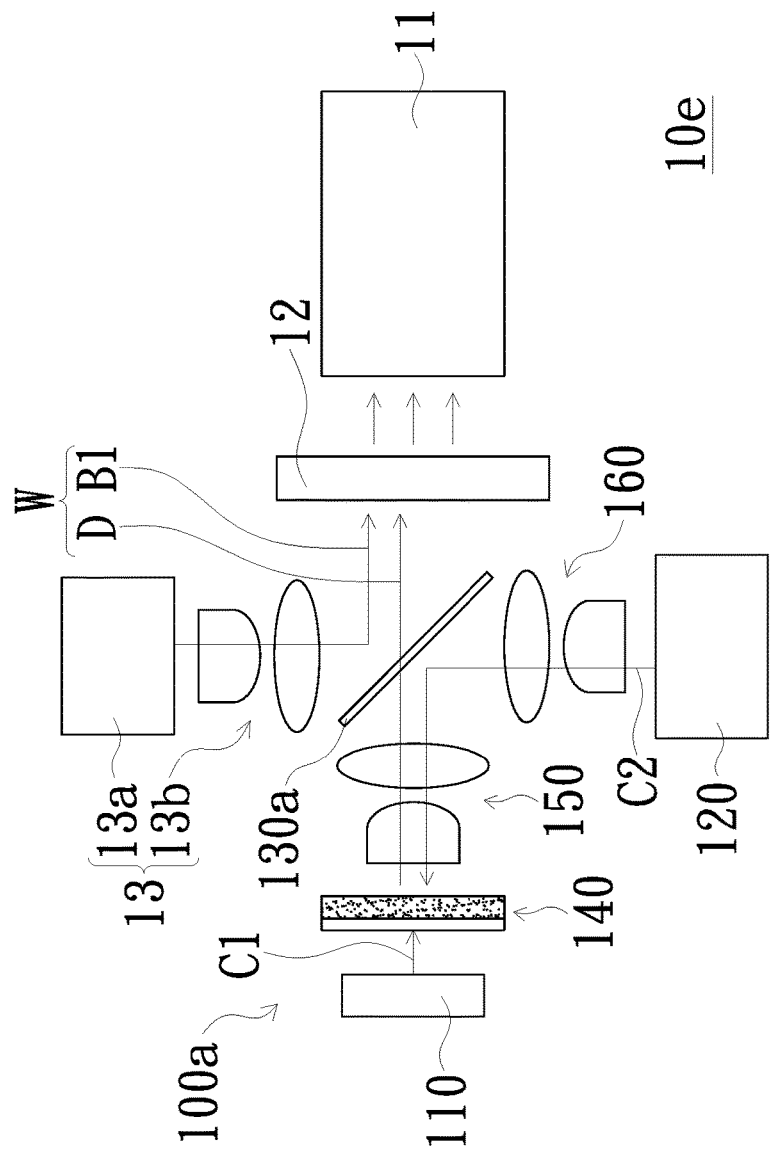
FIG. 7 is a schematic view of an illumination system in accordance with another embodiment of the invention.

FIG. 7 is a schematic view of an illumination system in accordance with another embodiment of the invention. As shown in FIG. 7, the illumination system 10e of the embodiment is similar to the illumination system 10d of FIG. 6, and only the difference between the two is described in the following. In the illumination system 10e of the embodiment, the first excitation light source 110 and the second excitation light source 120 of the light source assembly 100a are disposed on the same side of the dichroic element 130a. The second excitation beam C2 may be reflected by the dichroic element 130a; and the wavelength conversion beam D may pass through the dichroic element 130a and then is transmitted to the color wheel 12. The blue light source assembly 13 and the second excitation light source 120 are disposed on the two sides of the dichroic element 130a. The blue light source assembly 13 is configured to provide the blue beam B1 to the dichroic element 130a. The blue beam B1 may be reflected by the dichroic element 130 and then combined with the wavelength conversion beam D to form a white beam W. The white beam W is then transmitted to the color wheel 12.

Each one of the illumination systems 10~10e of the above embodiments has one light source assembly 100 or 100a. However, in another embodiment, the illumination system may include more than one light source assembly having a structure same as that of the light source assembly 100 or 100a.

Figure 8:
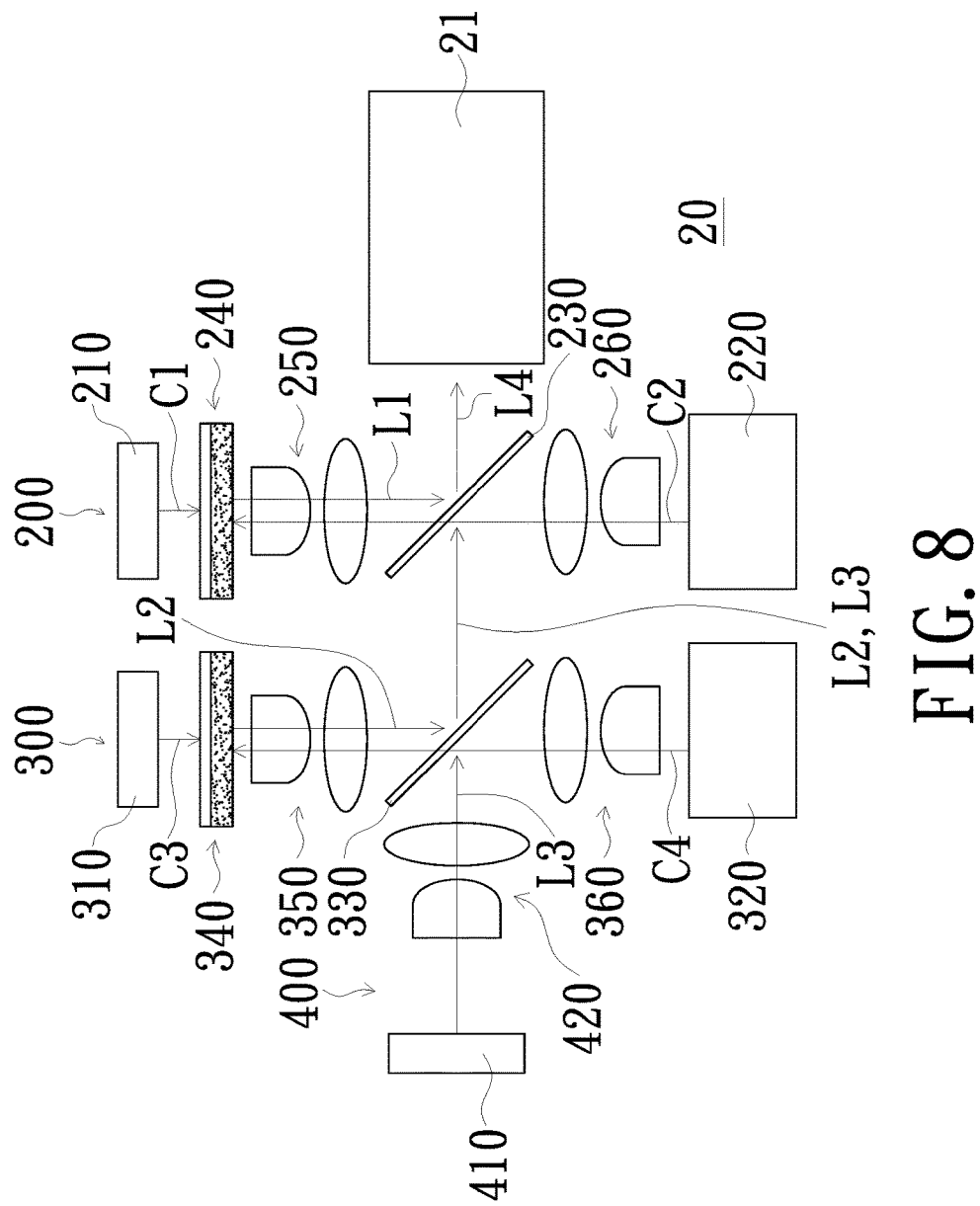
FIG. 8 is a schematic view of an illumination system in accordance with another embodiment of the invention.

FIG. 8 is a schematic view of an illumination system in accordance with another embodiment of the invention. As shown in FIG. 8, the illumination system 20 of the embodiment includes a first light source assembly 200 configured to provided a first color beam L1, a second light source assembly 300 configured to provided a second color beam L2, and a third light source assembly 400 configured to provided a third color beam L3; wherein the first color beam L1, the second color beam L2 and the third color beam L3 may be integrated as an illumination beam L4. The first light source assembly 200 includes a first excitation light source 210, a second excitation light source 220, a first dichroic element 230 and a first wavelength conversion element 240. The first excitation light source 210 is configured to provide a first excitation beam C1; the second excitation light source 220 is configured to provide a second excitation beam C2; and the first excitation beam C1 and the second excitation beam C2 have the same color. The first dichroic element 230 is disposed between the first excitation light source 210 and the second excitation light source 220. The second excitation beam C2 is transmitted toward the first excitation light source 210 via the first dichroic element 230. The first wavelength conversion element 240 is disposed between the first excitation light source 210 and the first dichroic element 230. The first wavelength conversion element 240 is configured to convert the first excitation beam C1 and the second excitation beam C2 into a first wavelength conversion beam and transmit the first wavelength conversion beam toward the first dichroic element 230; wherein the first wavelength conversion beam is defined as the aforementioned first color beam L1.

The second light source assembly 300 includes a third excitation light source 310, a fourth excitation light source 320, a second dichroic element 330 and a second wavelength conversion element 340. The third excitation light source 310 is configured to provide a third excitation beam C3; the fourth excitation light source 320 is configured to provide a fourth excitation beam C4; and the third excitation beam C3 and the fourth excitation beam C4 have the same color. The second dichroic element 330 is disposed between the third excitation light source 310 and the fourth excitation light source 320. The fourth excitation beam C4 is transmitted toward the third excitation light source 310 via the second dichroic element 330. The second wavelength conversion element 340 is disposed between the third excitation light source 310 and the second dichroic element 330. The second wavelength conversion element 340 is configured to convert the third excitation beam C3 and the fourth excitation beam C4 into a second wavelength conversion beam and transmit the second wavelength conversion beam toward the second dichroic element 330; wherein the second wavelength conversion beam is defined as the aforementioned second color beam L2.

The third light source assembly 400 includes a light source 410 configured to provide the third color beam L3. The light source 410 may be a light emitting diode, a laser light source, or other suitable light source. The third light source assembly 400 may further include a collimating element 420, which is disposed on the transmission path of the third color beam L3.

In the embodiment, the first light source assembly 200 and the second light source assembly 300 have a configuration similar to that of the light source assembly 100. The first wavelength conversion element 240 and the second wavelength conversion element 340 have a structure same as that of the wavelength conversion element 140. In one embodiment, the first wavelength conversion element 240 and the second wavelength conversion element 340 may cover the first excitation light source 210 and the third excitation light source 310, respectively. In another embodiment, the first wavelength conversion element and the first excitation light source may be integrated as an element similar to that shown in FIG. 2; and the second wavelength conversion element and the third excitation light source may be integrated as an element similar to that shown in FIG. 2. Further, the first excitation light source 210, the second excitation light source 220, the third excitation light source 310 and the fourth excitation light source 320 each may be a light emitting diode, a laser light source, or other suitable light source. In addition, the first light source assembly 200 may further include a first collimating element 250, which is disposed between the first wavelength conversion element 240 and the first dichroic element 230, and a second collimating element 260, which is disposed between the second wavelength conversion element 220 and the first dichroic element 230. The second light source assembly 300 may further include a third collimating element 350, which is disposed between the second wavelength conversion element 340 and the second dichroic element 330, and a fourth collimating element 360, which is disposed between the fourth wavelength conversion element 320 and the second dichroic element 330.

In the embodiment, the second dichroic element 330 is disposed between the first dichroic element 230 and the third light source assembly 400; and the third color beam L3 sequentially passes through the second dichroic element 330 and the first dichroic element 230. The third excitation light source 310 and the fourth excitation light source 320 are disposed on the two sides of the second dichroic element 330, respectively. The fourth excitation beam C4 may pass through the second dichroic element 330; the second color beam L2 may be reflected to the first dichroic element 230 by the second dichroic element 330; and the second color beam L2 may pass through the first dichroic element 230. The first excitation light source 210 and the second excitation light source 220 are disposed on the two sides of the first dichroic element 230, respectively. The second excitation beam C2 may pass through the first dichroic element 230; the first color beam L1 may be reflected by the first dichroic element 230, so that the first color beam L1, the second color beam L2 and the third color beam L3 are integrated as the illumination beam L4.

In the embodiment, the first excitation beam C1, the second excitation beam C2, the third excitation beam C3 and the fourth excitation beam C4 are blue light; but the invention is not limited thereto. The first color beam L1 is green light, the second color beam L2 is red light and the third color beam L3 is blue light; but the invention is not limited thereto. In another embodiment, the colors of the first color beam L1 and the second color beam L2 are interchangeable. In addition, the first light source assembly 200, the second light source assembly 300 and the third light source assembly 400 may be configured to simultaneously emit light or not emit light simultaneously. For example, the first light source assembly 200, the second light source assembly 300 and the third light source assembly 400 may sequentially provide the first color beam L1, the second color beam L2 and the third color beam L3 in timing, respectively; and accordingly, the illumination beam L4 at each time point includes only one of the first color beam L1, the second color beam L2 and the third color beam L3. In another embodiment, the first light source assembly 200, the second light source assembly 300 and the third light source assembly 400 may simultaneously provide the first color beam L1, the second color beam L2 and the third color beam L3, respectively; and accordingly, the illumination beam L4 at each time point is form by a mix of the first color beam L1, the second color beam L2 and the third color beam L3.

Figure 9:
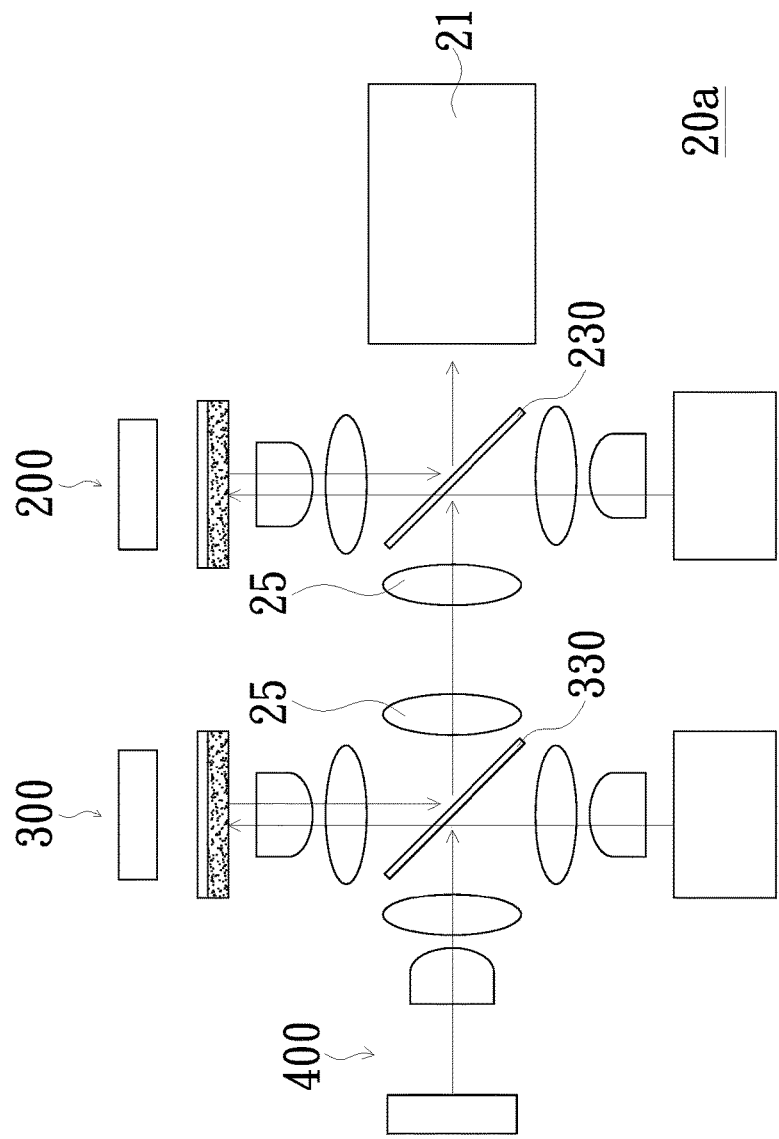
FIG. 9 is a schematic view of an illumination system in accordance with another embodiment of the invention.

Because the first light source assembly 200 and the second light source assembly 300 have a configuration similar to that of the light source assembly 100, the optical powers of the first color beam L1 and the second color beam L2 may be enhanced without increasing the light etendue. In addition, the illumination system 20 of the embodiment may further include other optical element(s), which is disposed on the transmission path of the illumination beam L4. The optical element may include a light equalizing element (e.g., light integral rod or lens array), a lens or a mirror, and the quantity of the aforementioned optical element may be one or more than one. FIG. 8 is exemplified by having a light integral rod 21. Further, other suitable optical elements may be disposed between the first dichroic element 230 and the second dichroic element 330 in response to actual requirements. As shown in FIG. 9, for example, the illumination system 20a of the embodiment further includes at least one lens 25, which is disposed between the first dichroic element 230 and the second dichroic element 330. Although FIG. 9 is exemplified by having two lenses 25, the quantity of the lens 25 or other optical element is not limited in the invention.

Figure 10:
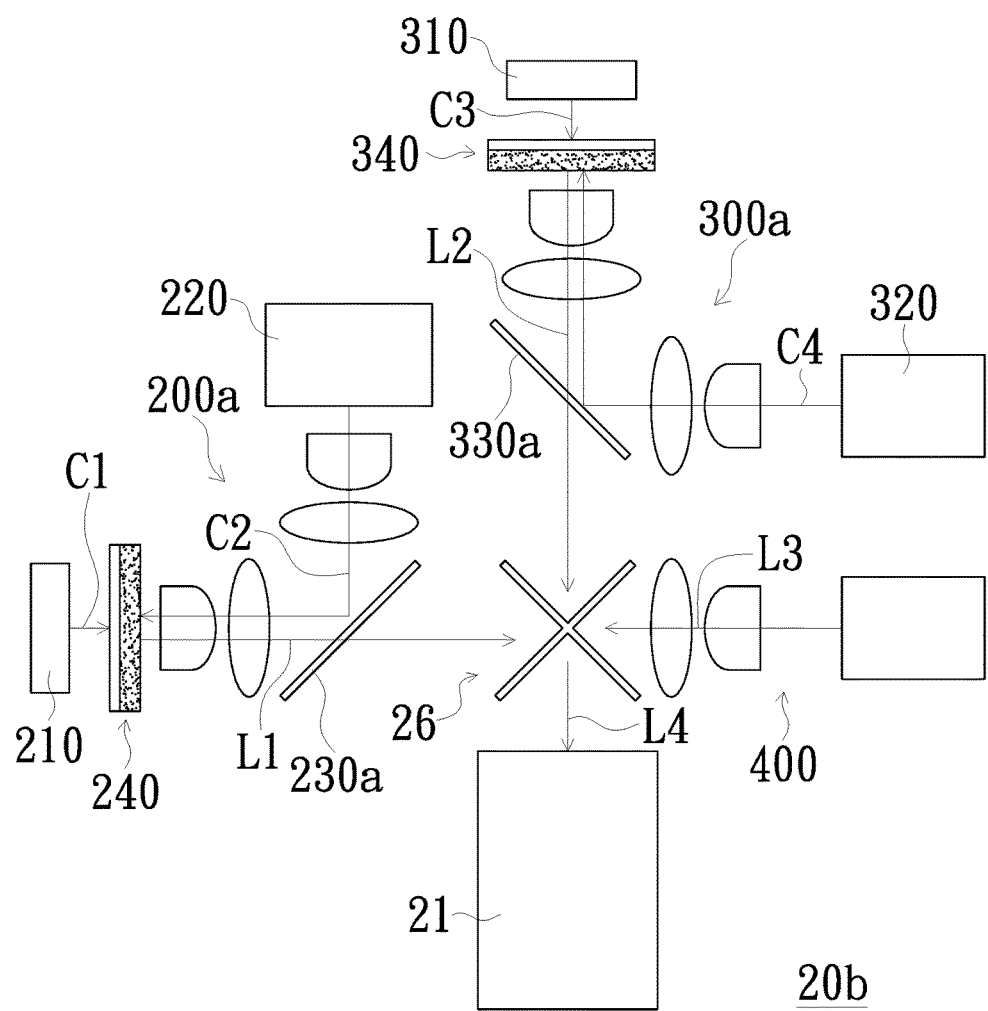
FIG. 10 is a schematic view of an illumination system in accordance with another embodiment of the invention.

FIG. 10 is a schematic view of an illumination system in accordance with another embodiment of the invention. As shown in FIG. 10, the illumination system 20b of the embodiment is similar to the illumination system 20 of FIG. 8, and only the difference between the two is described in the following. The illumination system 20b of the embodiment further includes a beam combiner 26, which is disposed among the first light source assembly 200a, the second light source assembly 300a and the third light source assembly 400. The first light source assembly 200a and the third light source assembly 400 are disposed on the two opposite sides of the beam combiner 26, respectively. The first color beam L1 and the third color beam L3 may be reflected by the beam combiner 26; the second color beam L2 may pass through the beam combiner 26; and so that the first color beam L1, the second color beam L2 and the third color beam L3 may be integrated as the illumination beam L4. In the embodiment, the beam combiner 26 may be an X beam combiner plate or an X beam combiner prism.

In the embodiment, the first light source assembly 200a and the second light source assembly 300a are similar to the light source assembly 100a in FIG. 3. That is, in the first light source assembly 200a, the first excitation light source 210 and the second excitation light source 220 are disposed on the same side of the first dichroic element 230a. The second excitation beam C2 may be reflected by the first dichroic element 230a; and the first color beam L1 may pass through the first dichroic element 230a and then is transmitted to the beam combiner 26. The third excitation light source 310 and the fourth excitation light source 320 are disposed on the same side of the second dichroic element 330a. The fourth excitation beam C4 may be reflected by the second dichroic element 330a; and the second color beam L2 may pass through the second dichroic element 330a and then is transmitted to the beam combiner 26.

Figure 11:
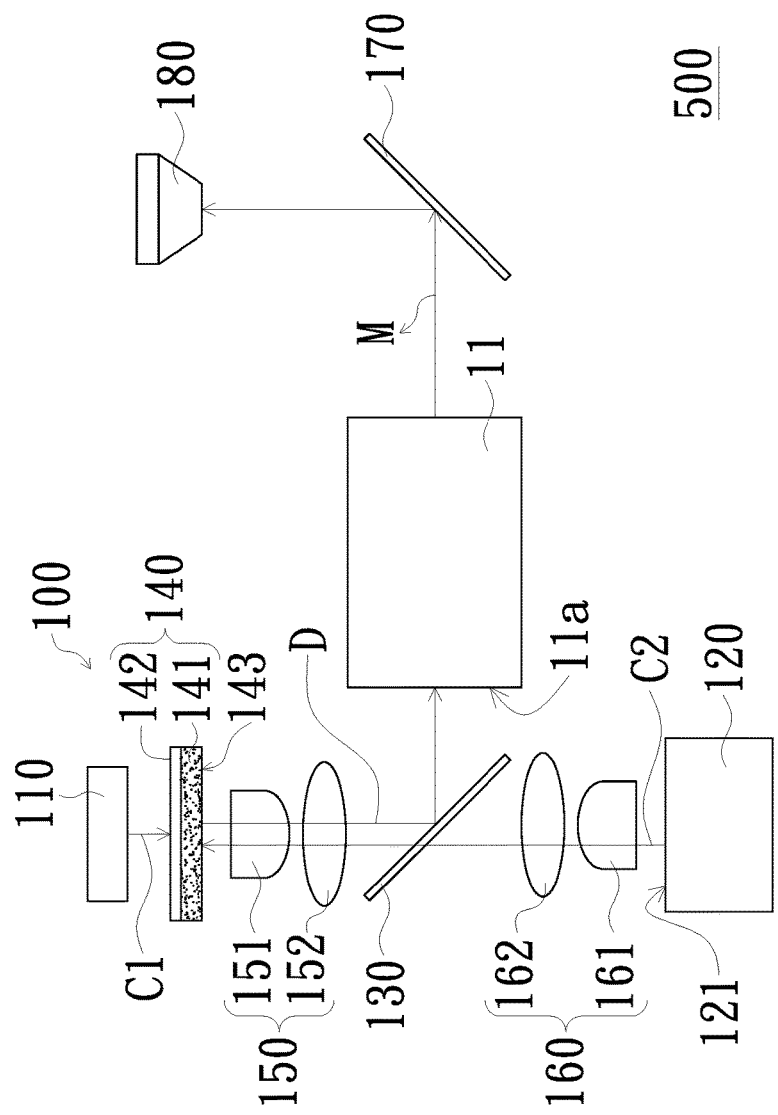
FIG. 11 is a schematic view of a projection apparatus in accordance with an embodiment of the invention.

FIG. 11 is a schematic view of a projection apparatus in accordance with an embodiment of the invention. As shown in FIG. 11, the projection apparatus 500 of the embodiment includes the illumination system 10 of FIG. 1, a light valve 170 and a projection lens 180. When the wavelength conversion beam D provided by the illumination system 10 is transmitted to the light equalizing element 11 (e.g., a light integral rod or a lens array), the wavelength conversion beam D first is equalized by the light equalizing element 11 and then is emitted on the light valve 170 uniformly. In the embodiment, the light valve 170 may be a digital micromirror device (DMD), a liquid crystal on silicon panel (LCoS) or other suitable component. The light valve 170 is configured to convert the wavelength conversion beam D into an image beam M. The image beam M is then projected into a screen (not shown) through the projection lens 180.

In summary, in the illumination system of the invention, the light source assembly has two excitation light sources for providing excitation beams and the two excitation beams excite the wavelength conversion element to emit the wavelength conversion through the two sides of the wavelength conversion element, respectively. Therefore, the optical power of the wavelength conversion beam may be enhanced without increasing the light etendue, and consequentially the illumination system has enhanced optical power of the beam provided by the illumination system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. An illumination system comprising a light source assembly, the light source assembly comprising:
   a first excitation light source, configured to provide a first excitation beam;
   a second excitation light source, configured to provide a second excitation beam, wherein the first excitation beam and the second excitation beam have the same color;
   a dichroic element, disposed between the first excitation light source and the second excitation light source;
   a wavelength conversion element, disposed between the first excitation light source and the dichroic element, wherein the second excitation beam is transmitted to the dichroic element and is directed toward the wavelength conversion element by the dichroic element, and the wavelength conversion element is configured to convert the first excitation beam and the second excitation beam into a wavelength conversion beam and transmit the wavelength conversion beam toward the dichroic element;
   a first collimating element, disposed between the wavelength conversion element and the dichroic element; and
   a second collimating element, disposed between the second excitation light source and the dichroic element, wherein an area size of a light-exiting surface of the second excitation light source is the same as an area size of a light-exiting surface of the wavelength conversion element, respectively.

2. The illumination system according to claim 1, further comprising a light integral rod, wherein the wavelength conversion beam is transmitted to the light integral rod through the dichroic element, and a ratio of an area size of a light-entering end of the light integral rod to the area size of the light-exiting surface of the wavelength conversion element is ranged from 0.9 to 1.1.

3. The illumination system according to claim 1, further comprising a lens array, wherein the wavelength conversion beam is transmitted to the lens array through the dichroic element.

4. The illumination system according to claim 1, wherein the first excitation light source and the second excitation light source are disposed on the two sides of the dichroic element, respectively, the second excitation beam passes through the dichroic element, and the wavelength conversion beam is reflected by the dichroic element.

5. The illumination system according to claim 4, further comprising a color wheel, disposed on the transmission path of the wavelength conversion beam reflected by the dichroic element.

6. The illumination system according to claim 5, wherein both of the first excitation beam and the second excitation beam are ultraviolet light and the wavelength conversion beam is white light.

7. The illumination system according to claim 1, wherein the first excitation light source and the second excitation light source are disposed on the same side of the dichroic element, the second excitation beam is reflected by the dichroic element, and the wavelength conversion beam passes through the dichroic element.

8. The illumination system according to claim 7, further comprising a color wheel disposed on the transmission path of the wavelength conversion beam passing through the dichroic element.

9. The illumination system according to claim 8, wherein both of the first excitation beam and the second excitation beam are blue light and the wavelength conversion beam is yellow light, the illumination system further comprises a blue light source assembly, the blue light source assembly and the second excitation light source are disposed on the two sides of the dichroic element, the blue light source assembly is configured to provide a blue beam to the dichroic element, the blue beam is reflected by the dichroic element and is combined with wavelength conversion beam to form a white beam, and the white beam is then transmitted to the light wheel.

10. The illumination system according to claim 1, wherein the wavelength conversion element is attached on the first excitation light source.

11. The illumination system according to claim 1, wherein the wavelength conversion element and the first excitation light source have a distance, and the distance is not greater than the distance between the wavelength conversion element and the dichroic element.

12. An illumination system comprising a light source assembly, the light source assembly comprising:
   a first excitation light source, configured to provide a first excitation beam;
   a second excitation light source, configured to provide a second excitation beam, wherein the first excitation beam and the second excitation beam have the same color;
   a dichroic element, disposed between the first excitation light source and the second excitation light source;
   a wavelength conversion element, disposed between the first excitation light source and the dichroic element, wherein the second excitation beam is transmitted to the dichroic element and is directed toward the wavelength conversion element by the dichroic element, and the wavelength conversion element is configured to convert the first excitation beam and the second excitation beam into a wavelength conversion beam and transmit the wavelength conversion beam toward the dichroic element;
   a first collimating element, disposed between the wavelength conversion element and the dichroic element; and
   a second collimating element, disposed between the second excitation light source and the dichroic element, wherein the first collimating element and the second collimating element have the same configuration, and the optical distance of the second excitation beam from the second excitation light source to the dichroic element is equal to the optical distance of the wavelength conversion beam from the wavelength conversion element to the dichroic element.

13. An illumination system comprising a first light source assembly configured to provide a first color beam, a second light source assembly configured to provide a second color beam and a third light source assembly configured to provide a third color beam, the first color beam, the second color beam and the third color beam are integrated as an illumination beam, the first light source assembly comprising:

a first excitation light source, configured to provide a first excitation beam;

a second excitation light source, configured to provide a second excitation beam, wherein the first excitation beam and the second excitation beam have the same color;

a first dichroic element, disposed between the first excitation light source and the second excitation light source, wherein the second excitation beam is transmitted toward the first excitation light source through the first dichroic element; and a first wavelength conversion element, disposed between the first excitation light source and the first dichroic element, wherein the first wavelength conversion element is configured to convert the first excitation beam and the second excitation beam into a first wavelength conversion beam and transmit the first wavelength conversion beam toward the first dichroic element, wherein the first wavelength conversion beam is the first color beam.

14. The illumination system according to claim 13, wherein the second light source assembly comprising:

a third excitation light source, configured to provide a third excitation beam;

a fourth excitation light source, configured to provide a fourth excitation beam, wherein the third excitation beam and the fourth excitation beam have the same color;

a second dichroic element, disposed between the third excitation light source and the fourth excitation light source, wherein the fourth excitation beam is transmitted toward the third excitation light source through the second dichroic element; and a second wavelength conversion element, disposed between the third excitation light source and the second dichroic element, wherein the second wavelength conversion element is configured to convert the third excitation beam and the fourth excitation beam into a second wavelength conversion beam and transmit the second wavelength conversion beam toward the second dichroic element, wherein the second wavelength conversion beam is the second color beam.

15. The illumination system according to claim 14, wherein the second dichroic element is disposed between the first dichroic element and the third light source assembly, the third color beam sequentially passes through the second dichroic element and the first dichroic element, the third excitation light source and the fourth excitation light source are disposed on the two sides of the second dichroic element, respectively, the fourth excitation beam passes through the second dichroic element, the second color beam is reflected to the first dichroic element by the second dichroic element, the second color beam passes through the first dichroic element, the first excitation light source and the second excitation light source are disposed on the two sides of the first dichroic element, respectively, the second excitation beam passes through the first dichroic element, the first color beam is reflected by the first dichroic element, and the first color beam, the second color beam and the third color beam is integrated as the illumination beam.

16. The illumination system according to claim 14, wherein the first light source assembly further comprises a first collimating element, disposed between the first wavelength conversion element and the first dichroic element, and a second collimating element, disposed between the second excitation light source and the first dichroic element; wherein the second light source assembly further comprises a third, disposed between the second wavelength conversion element and the second dichroic element, and a fourth collimating element, disposed between the fourth wavelength conversion element and the second dichroic element.

17. The illumination system according to claim 15, further comprising at least one lens disposed between the first dichroic element and the second dichroic element.

18. The illumination system according to claim 13, further comprising a beam combiner disposed among the first light source assembly, the second light source assembly and the third light source assembly, wherein the first light source assembly and the third light source assembly are disposed on the two opposite sides of the beam combiner, respectively, the first color beam and the third color beam are reflected by the beam combiner, the second color beam passes through the beam combiner, the first color beam, the second color beam and the third color beam are integrated as the illumination beam.

19. The illumination system according to claim 18, wherein the first excitation light source and the second excitation light source are disposed on the same side of the first dichroic element, the second excitation beam is reflected by the first dichroic element, the first color beam passes through the first dichroic element and then is transmitted to the beam combiner, the third excitation light source and the fourth excitation light source are disposed on the same side of the second dichroic element, the fourth excitation beam is reflected by the second dichroic element, and the second color beam passes through the second dichroic element and then is transmitted to the beam combiner.

20. A projection apparatus comprising a light source assembly, a light equalizing element, a light valve and a projection lens, the light source assembly comprising:

a first excitation light source, configured to provide a first excitation beam;

a second excitation light source, configured to provide a second excitation beam, wherein the first excitation beam and the second excitation beam have the same color;

a dichroic element, disposed between the first excitation light source and the second excitation light source;

a wavelength conversion element, disposed between the first excitation light source and the dichroic element, wherein the second excitation beam is transmitted to the dichroic element and is directed toward the wavelength conversion element by the dichroic element, and the wavelength conversion element is configured to convert the first excitation beam and the second excitation beam into a wavelength conversion beam and transmit the wavelength conversion beam toward the dichroic element;

a first collimating element, disposed between the wavelength conversion element and the dichroic element; and a second collimating element, disposed between the second excitation light source and the dichroic element, wherein the light equalizing element is disposed on the transmission path of the wavelength conversion beam and configured to receive the wavelength conversion beam transmitted from the dichroic element, wherein the light valve is disposed on the transmission path of the wavelength conversion beam and configured to convert the wavelength conversion beam, transmitted from the light equalizing element, into an image beam, wherein the projection lens is disposed on the transmission path of the image beam and is configured to project the image beam, wherein an area size of a light-exiting surface of the second excitation light source is the same as an area size of a light-exiting surface of the wavelength conversion element, respectively.

* * * * *